July 7, 1925.
W. STOECKICHT
FRICTION WHEEL GEAR
Filed Jan. 4, 1923
1,544,697
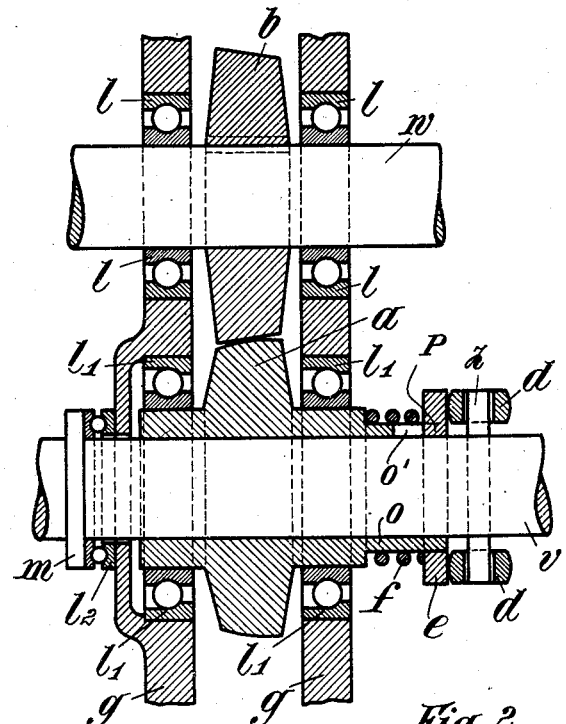
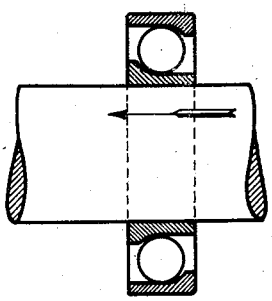
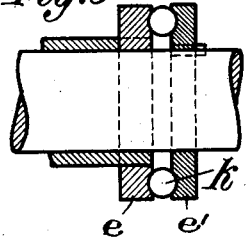
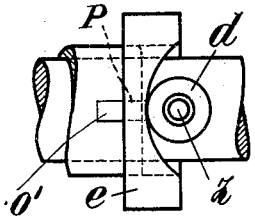
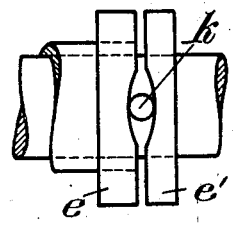
Inventor:
Wilhelm Stoeckicht
By
Attorney.

Patented July 7, 1925.

1,544,697

UNITED STATES PATENT OFFICE.

WILHELM STOECKICHT, OF MUNICH, GERMANY.

FRICTION-WHEEL GEAR.

Application filed January 4, 1923. Serial No. 610,631.

*To all whom it may concern:*

Be it known that I, WILHELM STOECKICHT, a citizen of the German Republic, residing at Munich, Germany, have invented certain new and useful Improvements in Friction-Wheel Gear (for which I have filed an application for patent of addition in Germany on the 23rd of January, 1922), of which the following is a specification.

This invention relates to a friction wheel gear of the type described in my patent application Serial Number 484,719, Patent Number 1,416,905, in which the friction wheels are in contact so that the tangent intersects the axes of rotation of the wheels at the point of contact of the friction surfaces. According to the prior patent one of the friction wheels is loosely mounted upon the driving shaft and engages by means of pins or rollers in grooves of the shaft so that during the rotation of shaft the one friction wheel is displaced with regard to the other friction wheel keyed upon the shaft to be driven.

The improvement and further development consists in that the loose driving wheel which is movable in axial direction is directly mounted in the casing and that the device for producing the contact pressure is no longer arranged inside the friction wheel. The necessary axial displacement of the friction wheel is controlled from the shaft by means of studs, rollers, balls or the like through the intermediary of cam disks situated outside the bearing proper of the driving gear and consequently accessible at any time for examination and repairs. The bearing of the driving wheel must be of such a construction that it permits of a certain axial play of the friction wheel, whereby the result is obtained that the device for regulating the contact pressure need no longer operate under the bearing pressure and can be arranged outside the casing.

Two forms of construction of the invention are shown on the drawing.

Fig. 1 shows the friction wheel drive in section.

Fig. 2 is a plan view of the cam disk with the roller drives by which the axial displacement of one friction wheel is effected.

Fig. 3 shows in cross section a form of construction in which instead of rollers balls and two cam disks are used.

Fig. 4 is a plan view of the form of construction shown in Fig. 3, and

Fig. 5 shows the arrangement of the bearings, which permit of an axial displacement of one friction wheel in the direction of the arrow without the production of sliding friction.

The fundamental arrangement of the device is similar to that described in my prior patent. It is evidently of no importance for the operation whether the shaft engages with rollers in grooves connected with the friction wheel or inversely. In the present case the form of construction is shown in which the shaft has rollers. The two friction wheels are again designated by $a$ and $b$ of which the first mentioned is mounted upon the driving shaft $v$, and the second upon the shaft $w$ to be driven. $d$ designates the rollers mounted upon convenient studs $z$ of shaft $v$ and adapted to contact with a cam disk $e$ and rolling upon the curved guide of the cam disk $e$. A spring $f$ which is not absolutely necessary for the operation of the device is preferably arranged between the friction wheel $a$ on the one hand and the cam disk $e$ on the other hand. In this case the cam disk $e$ is arranged upon a necklike extension $o$ of the friction wheel $a$ so that it can be displaced in axial direction but not revolve due to the projection $p$ integral with cam $e$ which engages in groove $o'$ in the extension. This spring arrangement has the advantage that upon actuation only small masses are moved and that the wheels as well as the shaft do not have to execute large axial displacements.

In the form of construction illustrated the shafts are mounted in ball bearings $l$ and $l'$ in the walls $g$ of the casing. The driving shaft $v$ carries a collar $m$ which bears against a roller step bearing $l^2$. The collar serves to intercept the axial thrust in the shaft. According to the form of construction shown in Figs. 3 and 4 one part does not act with rollers in a curved guide of the other part, where the rollers have the effect that the pressure is transmitted perpendicularly to the curved guiding, but both parts are connected each by means of similar cam disks wherein, the pressure is transmitted between the two disks by loose rollers or balls $k$ guided in a cage.

The operation of the device is as follows:—

If shaft $v$ is revolved the rollers $d$ roll upon the cam disk $e$ and shift the same against the tension of spring $f$ in the direction of the axis. Due to the pressure of spring $f$ the friction wheel is axially displaced and pressed against the friction disk $b$ until the friction is sufficiently great to transmit the moment of torsion upon the shaft $w$. According to the form of construction shown in Figs. 3 and 4 the balls or rollers are forced by the rotation of the cam disk $e'$ relative to the cam disk $e$ to roll upon the cam disk whereby the two disks are pressed away from one another with an axial force determined by the circumferential force of the curves in $e$ and $e'$. This arrangement is not to be confounded with a free-wheel or other arrangements in which balls or rollers are wedged in between two surfaces. In this case no wedging action takes place but the balls have merely the effect that the pressure is transmitted from one disk to the other due to an angle prescribed by the curved guides.

In Fig. 5 is shown how the ball bearings $l'$ must be constructed in order to be able to displace the friction wheel axially without sliding friction opposing this axial displacement. With this object in view the outer and inner races of the ball bearing each have only one shoulder, and the remainder of the race is cylindrical from this shoulder. If now an axial displacement of the shaft takes place in the direction of the arrow, the balls roll upon the cylindrical races. The axial force must overcome only the very low and uniform rolling resistancies whereby a very accurate adjusting of the contact pressure is ensured.

I claim:—

1. Friction gearing comprising a pair of bearing supports; a shaft mounted in said supports and having a wheel securely mounted thereon; a friction wheel rotatably mounted in said supports by means of extensions, one of the extensions having a cam thereon; a second shaft mounted in said friction wheel; and means on said last-named shaft coacting with said cam for forcing said friction wheel axially in said supports into frictional contact with the first-named wheel upon rotation of said second-named shaft to rotate the first-named shaft.

2. A friction wheel gear with friction surface standing obliquely to the axes comprising in combination with the driving shaft, and with the casing a friction wheel mounted upon said driving shaft loosely and movable in axial direction and situated directly in said casing, a cam disk and rollers arranged upon the outer side of the friction wheel and connecting said friction wheel with said driving shaft, and a ball bearing for said friction wheel having a cylindrical inner race and a cylindrical outer race so that at the axial displacement of said races the one towards the other only the rolling friction of the balls has to be overcome.

3. Friction gearing comprising supports; a shaft mounted in said supports and having a wheel rigidly mounted thereon; a friction wheel having extended portions thereon, said friction wheel being mounted in said supports by means of the extended portions; a cam on one of said extended portions; a second shaft mounted in said friction wheel; and means on said last-named shaft coacting with said cam for forcing said friction wheel by means of the extended portions axially in said supports into frictional contact with the first-named wheel upon rotation of said second-named shaft to rotate the first-named shaft.

4. A friction wheel gear with friction surface standing obliquely to the axes comprising in combination with the driving shaft, and with the casing a friction wheel mounted upon said driving shaft loosely and movable in axial direction and situated directly in said casing, an extended hub of said friction wheel, a cam disk mounted upon said hub of the friction wheel so that it can be displaced upon the same but not revolve, a second cam disk opposite said first mentioned cam disk and balls between said two cam disks.

5. A friction wheel gear with friction surface standing obliquely to the axes comprising in combination with the driving shaft, and with the casing a friction wheel mounted upon said driving shaft loosely and movable in axial direction and situated directly in said casing, an extended hub of said friction wheel, a cam disk mounted upon said hub of the friction wheel so that is can be displaced upon the same but not revolve, a spring between said cam disk and said friction wheel, a second cam disk opposite said first mentioned cam disk and balls between said two cam disks.

6. A friction wheel gear with friction surface standing obliquely to the axes comprising in combination with the driving shaft, and with the casing a friction wheel mounted upon said driving shaft loosely and movable in axial direction and situated directly in said casing, an extended hub of said friction wheel, a cam disk mounted upon said hub of the friction wheel so that it can be displaced upon the same but not revolve, a spring between said cam disk and said friction wheel, a second cam disk opposite said first mentioned cam disk and rollers between said two cam disks.

7. Friction gearing comprising bearing supports; a shaft mounted in said supports; a wheel securely mounted on said shaft and between said supports; a friction wheel having extended portions thereon, said friction wheel being mounted in said supports by means of the extended portions; a spring pressed cam on one of said extended portions; a second shaft rotatably mounted in said friction wheel; and means on said last-named shaft coacting with said cam for forcing said friction wheel axially in said supports into frictional contact with the first-named wheel upon rotation of said second-named shaft to rotate the first-named shaft.

8. Friction gearing comprising a pair of bearing supports; a shaft rotatably mounted in said supports; a wheel mounted on and adapted to rotate with said shaft; a second wheel having extended portions thereon mounted in said supports, said wheels being mounted between said supports and one of said extended portions being elongated and projecting outside of said supports; a second shaft mounted coaxially to said second-named wheel, said second-named wheel and said extended portions being rotatably mounted and axially slidable in said supports; and means for forcing said last-named wheel axially into frictional contact with the first-named wheel upon rotation of said last named shaft to rotate said first named shaft.

9. Friction gearing comprising supports; a shaft mounted in said supports and having a wheel rigidly mounted thereon; a friction wheel having extended portions thereon, said friction wheel being mounted in said supports by means of the extended portions; a cam on one of said extended portions; a second shaft mounted in said friction wheel; and a plurality of rollers cooperating with said last-named shaft and said cam for forcing said frictional wheel axially in said supports into frictional contact with the first-named wheel upon rotation of said second-named shaft to rotate the first-named shaft.

In testimony whereof I affix my signature in presence of two witnesses.

WILHELM STOECKICHT.

Witnesses:
   ALESEI PHILIPPOFF,
   THERESE KELLY.